United States Patent [19]

Pinoca et al.

[11] Patent Number: 5,747,160
[45] Date of Patent: May 5, 1998

[54] HIGH TENACITY PROPYLENE POLYMER FIBER AND PROCESS FOR MAKING IT

[75] Inventors: Leonardo Pinoca, Terni; Renato Africano, Ferrara; Giancarlo Braca, Terni, all of Italy

[73] Assignee: Montell North America Inc., Wilmington, Del.

[21] Appl. No.: 647,507

[22] Filed: May 14, 1996

[30] Foreign Application Priority Data

May 15, 1995 [IT] Italy .................. MI95A0982

[51] Int. Cl.$^6$ .................................. G09B 3/00
[52] U.S. Cl. .................. 428/364; 447/327; 447/59; 525/240
[58] Field of Search .............. 428/364; 442/327; 525/240

[56] References Cited

U.S. PATENT DOCUMENTS

| | | | |
|---|---|---|---|
| 4,626,467 | 12/1986 | Hostetter | 428/288 |
| 4,916,198 | 4/1990 | Scheve et al. | 526/351 |
| 5,047,445 | 9/1991 | Nishizawa | 522/114 |
| 5,047,446 | 9/1991 | Denicola, Jr. | 522/157 |
| 5,047,485 | 9/1991 | Denicola, Jr. | 525/387 |
| 5,368,919 | 11/1994 | Robeson | 428/224 |
| 5,414,027 | 5/1995 | Denicola, Jr. et al. | 522/112 |

FOREIGN PATENT DOCUMENTS

| | | |
|---|---|---|
| 400333 | 12/1990 | European Pat. Off. |
| 472946 | 3/1992 | European Pat. Off. |

*Primary Examiner*—Helen Lee

[57] ABSTRACT

Process for the production of a high tenacity propylene polymer fiber which includes:

spinning fiber from a molten propylene polymer composition which essentially includes an olefin polymer (I) and a high molecular weight propylene polymer (II) having a branching index less than 1 and melt strength from 5 to 40 cN; the propylene polymer (II) being present in a concentration from 0.1 to 10% by weight with respect to the total weight of the composition; and drawing the solid fiber thus obtained with a draw ratio greater than 4.5 when the spinning step is continuous and greater than 5 when the spinning step is discontinuous.

4 Claims, No Drawings

HIGH TENACITY PROPYLENE POLYMER FIBER AND PROCESS FOR MAKING IT

The present invention concerns a process for the production of propylene polymer fibers, the fibers that can be obtained from said process, and a propylene polymer composition for the production of said fibers. More particularly, the present invention refers to both staple and continuous filament fibers, obtained by a continuous or discontinuous spinning and drawing process, having high tenacity and prepared from olefin polymer materials containing a high melt strength propylene polymer.

The definition of fibers includes also products similar to fibers, such as fibrils.

The propylene polymer fiber of the present invention is particularly adequate for the use in applications where high tenacity fibers are required. For example, high tenacity continuous filament fibers are useful in the manufacture of ropes, handles, belts and strips for back-packs and handbags. High tenacity staple fibers are useful in the manufacture, for example, of felt for markers and pens, in nonwoven fabrics for geotextiles, cement reinforcements, and in supports for synthetic leather.

It is already known in the art that an increase in fiber tenacity, especially in the production of continuous filament in a process involving spinning and continuous drawing, can be obtained by increasing the draw ratios.

An increase in draw ratio, however, presents some inconveniences. The main inconvenience caused by high draw ratios is the possibility of the fiber breaking during drawing.

Moreover, high draw ratios involve an increase in draw tension. High draw tension reduces the number of filaments that can be drawn at the same time.

Now it has been found that high tenacity fibers can be produced from a propylene polymer composition containing branched propylene polymer having high melt strength.

An advantage in the use of the above mentioned propylene polymer composition in the production of fibers, resides in being able to carry out the fiber drawing step at a high draw ratio without an increase in draw tension.

An other advantage due to the use of the above composition consists in the fact that in order to obtain a given tenacity one can operate at a lower draw tension with respect to the draw tension that would be needed to obtain the same tenacity in a fiber formed from a composition that does not contain the above mentioned branched propylene polymer.

An additional advantage of the above propylene polymer composition is increased fiber production as a result of the propylene polymer composition allowing one to use higher draw ratios, and thus, at equal denier of the drawn fiber obtained and spinning rates, it is possible to carry out the spinning step at higher hole flow rate values.

Therefore, object of the present invention is a process for the preparation of a high tenacity propylene polymer fiber. Said process comprises:

spinning fiber from a molten propylene polymer composition consisting essentially of an olefin polymer (I) and a high molecular weight propylene polymer (II) having a branching index less than 1 and melt strength from 5 to 40 centiNewton (cN); said propylene polymer (II) being present in a concentration from 0.1 to 10% by weight, preferably from 0.1% to 5%, more preferably from greater than 0.2 to less than 0.5% by weight, most preferably from 0.25 to 0.45% by weight with respect to the total weight of the composition; and drawing the solid fiber thus obtained with a draw ratio greater than 4.5 when the spinning step is continuous, and greater than 5 when the spinning step is discontinuous.

The process of the present invention provides fibers with high tenacity, for example a tenacity greater than 50 cN/tex, preferably equal to or greater than 55 cN/tex.

Therefore, another object of the present invention is a propylene polymer fiber having a tenacity greater than 50 cN/tex. The fiber comprises a propylene polymer composition consisting essentially of an olefin polymer (I) and a high molecular weight propylene polymer (II) having a branching index less than 1 and melt strength from 5 to 40 cN; said propylene polymer (II) being present in a concentration from 0.1 to 10% by weight, preferably from 0.1% to 5%, more preferably from more than 0.2 to less than 0.5% by weight, most preferably from 0.25 to 0.45% by weight with respect to the total weight of the composition.

A particular composition that can be used in the process of the present invention is the one where the propylene polymer (II) is present in a concentration from greater than 0.2 to less than 0.5% by weight, preferably from 0.25 to 0.45% by weight, with respect to the total weight of the composition.

Therefore, an additional object of the present invention is a propylene polymer composition consisting essentially of an olefin polymer (I) blended with a high molecular weight propylene polymer (II) having a branching index less than 1 and melt strength from 5 to 40 cN; said propylene polymer (II) being present in a concentration from greater than 0.2 to less than 0.5% by weight with respect to the total weight of the composition.

The above mentioned olefin polymer (I) is preferably selected from:

1) isotactic propylene homopolymers having an isotactic index greater than 90;

2) random copolymers of propylene with ethylene and/or a $C_4$–$C_8$ α-olefin; and 3) heterophasic polymers comprising (by weight):
   A) from 10 to 99.5 parts of a propylene homopolymer or a copolymer of propylene with ethylene and/or a $C_4$–$C_8$ α-olefin, containing over 80% of propylene and having an isotactic index greater than 80, or mixtures thereof (Fraction A);
   B) from 0 to 25 parts of an essentially linear semicrystalline ethylene copolymer, insoluble in xylene at ambient temperature (Fraction B); and
   C) from 0.5 to 87 parts of a copolymer fraction of ethylene with propylene and/or a $C_4$–$C_8$ α-olefin, and optionally minor quantities of diene, said copolymer fraction containing from 10 to 80% of ethylene, and being soluble in xylene at ambient temperature (Fraction C);

4) mixtures of homopolymers (1) with copolymers (2).

The above polymers preferably have a melt flow rate (MFR) from 0.5 to 60 g/10 min, more preferably from 10 to 35 g/10 min. In particular MFR from 10 to 15 g/10 min are preferred for polymers used in the discontinuous spinning process, while MFR from 20 to 35 g/10 min are preferred for polymers used in the continuous spinning process.

As is known, high MFR are obtained directly in polymerization or by controlled radical degradation of the polymer by adding, for example, organic peroxides in the spinning lines, or during previous pelletizing stages of the olefin polymers.

The $C_4$–$C_8$ α-olefin contained in random copolymers (2) and/or Fraction A, and optionally in Fraction C of heterophasic polymers (3), are linear or branched alkenes, and are preferably selected from the following compounds: 1-butene, 1-pentene, 1-hexene, 1-octene, and 4-methyl-1-pentene. Particularly preferred is the 1-butene α-olefin.

Random copolymers (2) that can be used pure in the process of the present invention contain a polymerized comonomer in amounts from 0.05 to 20% by weight; whenever the quantity of comonomer exceeds 5%, said copolymers must be blended with the propylene homopolymer before spinning.

Fraction A of heterophasic polymer (3) is preferably made up of a propylene homopolymer with an isotactic index preferably greater than 90, more preferably from 95 to 98, or of the copolymer mentioned above containing preferably over 85%, more preferably from 90 to 99%, of propylene, or mixtures of the above mentioned polymers.

Fraction B of heterophasic polymer (3) preferably is present in an amount from 0 to 15 parts by weight and has a crystallinity from about 20 to 60%, as determined by DSC (Differential Scanning Calorimetry). The Fraction B copolymer is preferably selected from the following types of copolymers: an ethylene/propylene copolymer, containing over 55% of ethylene; an ethylene/propylene/$C_4$–$C_8$ α-olefin copolymer, containing from 1 to 10% of said α-olefin and from 55% to 98%, preferably from 80 to 95%, of ethylene and α-olefin and an ethylene/$C_4$–$C_8$ α-olefin copolymer, containing from 55% to 98%, preferably from 80 to 95%, of said α-olefin.

Fraction C of heterophasic polymer (3) preferably is present in an amount from 0.5 to 75 parts by weight. Preferable Fraction C copolymer are an ethylene/propylene copolymer containing from 15% to 70% polymerized ethylene, preferably from 20 to 60%; an ethylene/propylene/$C_4$–$C_8$ α-olefin copolymer containing from 1 to 10% polymerized α-olefin, preferably from 1 to 5%, in which the total amount of polymerized ethylene and the α-olefin is from 20 to less than 40%; an ethylene/α-olefin copolymer, containing from 20 to less than 40%, preferably from 20 to 38%, more preferably from 25 to 38%, of polymerized α-olefin. The dienes, optionally present in the copolymers of Fraction C, are preferably present in quantities equal to or less than 10%. Preferable dienes are: butadiene, 1,4-hexadiene, 1,5-hexadiene, and 2-ethylidene-5-norbornene.

Heterophasic polymer (3) can be prepared either by mechanically blending in the molten state components (A), (B), (C), or by sequential polymerization carried out in two or more stages, and using highly stereospecific Ziegler-Natta catalysts.

Examples of above mentioned heterophasic polymers (3), as well as polymerization catalysts and processes commonly used for their preparation are disclosed in published European patent applications Nos. 400,333 and 472,946.

The mixtures (4) are obtained by way of melting and pelletizing, or by blending polymers without melting.

Component (II) is a propylene polymer having a branching index preferably from 0.1 to 0.9, more preferably from 0.25 to 0.8. The branching index, which is a measure of the degree of branching of the polymer long chains, is defined by the following formula $$(I.V.)_1/(I.V.)_2$$

where $(I.V.)_1$, represents the intrinsic viscosity of the branched polymer, and $(I.V.)_2$ represents the intrinsic viscosity of the linear polymer having substantially the same weight average molecular weight. The intrinsic viscosities are determined in decahydronaphthaline at 135° C.

By high molecular weight is meant a polymer with a weight average molecular weight of at least about 50,000, preferably about 100,000.

Said propylene polymer (II) is selected from:
a) a propylene homopolymer;
b) a random copolymer of propylene and an olefin selected from ethylene and $C_4$–$C_{10}$ α-olefins, provided that when said olefin is ethylene, the maximum content of polymerized ethylene is about 5% by weight, preferably about 4%, and when said olefin is a $C_4$–$C_{10}$ α-olefin the maximum of polymerized α-olefin is about 20% by weight, preferably about 16%; and
c) the random copolymer of propylene with two olefins selected from ethylene and $C_4$–$C_8$ α-olefins, provided that when said olefin is a $C_4$–$C_8$ α-olefin the maximum content of polymerized α-olefin is about 20% by weight, preferably about 16%, and that when said olefin is ethylene, the maximum content of polymerized ethylene is about 5% by weight, preferably about 4%.

Preferably propylene polymer (II) is a propylene homopolymer.

The above mentioned α-olefins in propylene polymer (II) can be linear or branched, and are preferably selected from 1-butene, 1-isobutene, 1-pentene, 3-methyl-1-butene, 1-hexene, 3,4-dimethyl-1-butene, 1-heptene, and 3-methyl-1-hexene.

Propylene polymer (II) can be prepared using various techniques starting with the corresponding conventional linear polymers. In particular it is possible to subject the linear polymers to controlled modification processes by way of radical generators through irradiation or peroxide treatment. The starting polymers are linear, have high molecular weight, are normally solid, and can be in any form, such as, spheroidal, fine powder, granules, flake and pellets.

The irradiation method is typically carried out according to what is described in U.S. Pat. Nos. 4,916,198 and 5,047,445, where the polymers are treated with high power radiations (such as electrons or gamma radiations for example), the disclosures of which are incorporated herein by reference. By way of example the quantity of radiation ranges from 0.25 and 20 MRad, preferably 3–12 Rad, and the irradiation intensity ranges from 1 to 10,000 MRad per minute, preferably from 18 to 2,000 MRad per minute.

The treatment with peroxides is carried out, for example, according to the method described in U.S. Pat. No. 5,047,485, the disclosure of which is incorporated herein by reference. It provides for the mixing of the linear polymers with organic peroxides and subsequent heating of the mixture to a temperature sufficient to decompose the peroxides.

Propylene polymer (II) can be blended to component (I) as is or as part of a concentrate. For example, in case of the latter the propylene polymer can be dispersed in a propylene polymer resin that can be same as or different from component (I).

The propylene polymer composition used in the process of the present invention preferably comprises at least one stabilizer selected from those commonly used for olefin polymers. Examples of such stabilizers and their concentrations useful in such composition include:

organic phosphites and/or phosphonites, preferably in quantities ranging from 0.01 to 0.5% by weight, more preferably from 0.02 to 0.15%;

HALS (Hindered Amine Light Stabilizers), preferably in quantities ranging from 0.005 to 0.5% by weight, more preferably from 0.01 to 0.025%;

phenolic antioxidants, preferred concentrations being up to 0.02% by weight.

Examples of phosphites useful as additives for the polyolefins of the fibers of the present invention include: tris(2, 4-di-tert-butyl)phosphite, from Ciba Geigy, marketed under the Irganox 168 trademark; tris(2,4-di-tert-butyl phenyl) phosphite, from Ciba Geigy, marketed under the Irgafos 168 trademark; distearyl pentaerythritol diphosphite, from Borg-Warner Chemical, marketed under the Weston 618 trademark; 4,4'-butylidene bis(3-methyl-6-tert-butyl phenyl-di-tridecyl)phosphite, from Adeka Argus Chemical, marketed under the Mark P trademark; tris(monononyl phenyl) phosphite and bis(2,4-di-tert-butyl)pentaerythritol diphosphite, from Borg-Warner Chemical, marketed under the Ultranox 626 trademark.

A preferred organic phosphonite that can be used as additive for the polyolefins of the fibers of the present invention is the tetrakis(2,4-di-tert-butyl phenyl)4,4'-diphenylene diphosphonite, from Sandoz, marketed under the Sandostab P-EPQ trademark.

Examples of HALS to be added to the polyolefins of the fibers of the present invention are the compounds known under the following trademarks: Chimassorb 994, Chimassorb 905, Tinuvin 770, Tinuvin 992, Tinuvin 622, Tinuvin 144, Spinuvex A36, by Ciba Geigy and Cyasorb UV 3346, by American Cyanamide.

Examples of preferred phenolic antioxidants to be used as additives in the polyolefins comprised in the fibers of the present invention are: tris(4-tert-butyl-3-hydroxy-2,6-dimethyl benzyl)-s-triazine-2,4,6-(1H,3H,5H)-trione, marketed by American Cyanamid under the Cyanox 1790 trademark; calcium bi[monoethyl (3,5-di-tert-butyl-4-hydroxybenzyl)phosphonate]; 1,3,5-tris(3,5-di-tert-butyl-4-hydroxybenzyl)-s-triazine-2,4,6(1H,3H,5H)trione; 1,3,5-trimethyl-2,4,6-tris (3,5-di-tert-butyl-4-hydroxybenzyl) benzene; pentaetythrityl-tetrakis[3-(3,5-di-tert-butyl-4-hydroxyphenyl)propionate, marketed by Ciba Geigy with the trademarks Irganox 1425, Irganox 3114, Irganox 1330, and Irganox 1010, respectively, and 2,6-dimethyl-3-hydroxy-4-tert-butylbenzyl abietate.

In addition to the above mentioned stabilizers one can also add to the polyolefins, which are then converted into the fibers of the present invention, the common additives to polymers such as pigments, opacifiers, fillers, UV stabilizers, flame retardants, antacids and whiteners.

The polymers to be converted to the fibers of the present invention can be in the form of pellets or nonextruded particles, such as flake, or spheroidal particles with a diameter varying from 0.5 to 4.5 mm. The particles can be coated or impregnated, at least on the surface, or mechanically mixed with the stabilizers (or additives in general) mentioned above, and/or peroxides, whenever the latter are necessary to obtain the desired MFR.

Additives such as opacifiers, fillers, and pigments can also be added during the spinning of the fiber.

The process of the present invention can be carried out in continuous or discontinuous, according to known operating techniques and conditions. By way of example, the spinneret hole flow-rate preferably varies from 0.5 to 2 g/min in the continuous filament process, while it varies from 0.2 to 1.5 g/min in long spinning, and from 0.01 to 0.1 g/min in short spinning for staple fibers. The spinning temperature can be, for example, from 220° to 310° C. Drawing of the fiber is carried out by gathering the solid on a first roller, or a first series of rollers, and causing it then to pass to at least one additional roller or series of rollers. The second roller or series of rollers are rotated at a higher speed than the first roller or series of rollers. The draw ratio that is the ratio of the rotational speed of the roller or series of rollers rotated at a higher speed to the rotational speed of the first roller or first series of rollers, is preferably from 5.2 to 6.2.

The polymer composition used in the process of the present invention allows one to operate with very high maximum draw ratios. It is obvious, however, that one can operate at a draw ratio equal to the maximum one or at a lower draw ratio.

Maximum draw ratio is the draw ratio between the maximum speed of the roller or series of rollers at the highest speed, that allows the draw of the fiber without it breaking within a period of 10 minutes, and the speed of the first roller or first series of rollers.

Generally speaking the fibers of the present invention have a denier from 1 to 12 dtex (1 dtex corresponds to 1 g/10.000 m). Typically the denier of the staple fibers varies from about 1.5 to 3.5 dtex, while the denier of the continuous filament fibers is from about 4 to 12 dtex.

Some test were conducted on the polymer material and the fibers of the present invention in order to evaluate their characteristics and properties; the methodology used for said tests is described below.

Isotactic index: determined as residue insoluble in xylene at 25° C.

Melt Flow Rate (MFR): according to ASTM-D 1238, condition L.

Melt strength: measured with a Rheotens Melt Tension Instrument model 2001, by Gottfert (Germany). The method consists of measuring the resistance, expressed in centiNewton (cN), presented by the traction of a molten polymer strand, operating at a set drawing velocity. In particular, the polymer to be tested is extruded at 200° C. through a die with a capillary hole 22 mm long and 1 mm in diameter. The molten exiting strand is then drawn by a system of pulleys at a constant acceleration of 0.012 cm/sec$^2$, while measuring the tension of the strand until complete break occurs. The apparatus registers tension values (resistance in cN) of the strand as a function of the extant of the draw. The maximum tension is reached when the strand breaks and this corresponds to the melt strength.

Filaments' denier: according to ASTM D 1577-79.

Maximum draw ratio: the ratio between the maximum rotational speed of the second roller at which the fiber is drawn without it breaking for a period of 10 minutes, to the rotation speed of the first roller.

Tenacity: according to ASTM D 2101-72.

The following examples are given in order to illustrate but not limit the present invention.

EXAMPLE 1

Flake polypropylene having an isotactic index of 96 and MFR of 12 dg/min, mixed with calcium stearate, titanium dioxide, propylene homopolymer (HMS 023 S), properly pulverized, with a branching index of 0.6, melt strength of 22 cN, and MFR of 4 dg/min, and with the following stabilizers: octadecyl [3-(3,5-di-tert-butyl-4-hydroxyphenyl)proprionate (Irganox 1076), tetrakis(2,4-di-tert-butyl phenyl)4,4'-di-phenylene diphosphonite (Sandostab P-EPQ), and poly-{[6-(1,1,3,3-tetramethyl butyl)amino]-1,3,5-triazine-di[2,2,6,6-tetramethyl-4-piperidyl)imino]hexamethylene[(2,2,6,6-tetramethyl-4-piperidyl)imino]} (Chimassorb 994). The components were blended in a "Caccia" rapid mixer for 2 minutes at 1400 rpm. In Table 1 are reported the percentages by weight of the mixture components mentioned above.

The resulting composition was then subjected to drawing by using a plant having the characteristics and operating conditions set forth below:

spinning temperature: 285° C.;

hole flow-rate: 0.32 g/min;

numbers of holes in the die: 61 diameter of hole: 0.4 mm;

length of hole: 2.0 mm;

cooling air temperature: 19° C.;

cooling air velocity: 0.7 m/sec;

spinning gathering speed: 380 m/min.

The spun fiber was gathered on bobbins and then subjected to discontinuous drawing in which the fiber was heated with steam. The drawing line used comprised two rollers, with the first roller rotated at a speed of 35 m/min. and the second roller was rotated at higher speed to determin the maximum draw ratio which was 6.2.

The fiber obtained in this manner had a tenacity of 62 cN/tex, and a draw tension, measured with a Rothschild tensiometer model R-3192, of 2.4 cN/filament.

COMPARATIVE EXAMPLE 1C

This was conducted according to Example 1, except that component (II) was omitted from the composition. Table 1 shows the percentages by weight of the components of the mixture.

The maximum draw ratio was 5.0, and the tenacity of the fiber thus obtained was 49 cN/tex. The draw tension, measured as in Example 1, was 2.7 cN/filament.

By comparing it with Example 1 it can be seen that the fiber of Example 1 according to the invention, in addition to superior tenacity, can be produced at a lower draw tension. Hence, it is possible to increase the number of filaments that can be drawn at the same time.

EXAMPLE 2

Flake polypropylene, with an isotactic index of 96, MFR of 25 dg/min, is mixed with calcium stearate, propylene homopolymer (HMS 023 S), properly pulverized, with a branching index of 0.6, melt strength of 22 cN, and MFR of 4 dg/min, and with the following stabilizers: octadecyl[3-(3,5-di-tert-butyl-4-hydroxyphenyl)proprionate (Irganox 1076), 1,3,5-tris(3,5-di-tert-butyl-4-hydroxybenxyl)-s-triazine-2,4,6-(1H,3H,5H)trione (Irganox 3114), and tris(2,4-di-tert-butyl)phosphite (Irganox 168). The above mentioned components were mixed in the same apparatus and under the same conditions as Example 1.

Table 1 shows the percentages by weight of the components of this blended composition.

The composition was then subjected to spinning and drawing by a continuous spinning and drawing process at the following conditions:

spinning temperature: 250° C.;

hole flow-rate: 1.8 g/min;

numbers of holes in the die: 19;

diameter of hole: 1.0 mm;

length of hole: 4 mm;

cooling air temperature: 19° C.;

cooling air velocity: 0.7 m/sec;

spinning gathering speed: 400 m/min;

draw temperature: 100° C.

The fiber was gathered at a speed of 400 m/min on a first roller (gathering roller), drawn therefrom by a second roller (drawing roller) rotated at a speed of 2400 m/min. The maximum draw ratio is 6.

The resulting fiber has a tenacity of 61 cN/tex.

COMPARATIVE EXAMPLE 2C

This was conducted according to Example 2, except that no component (II) was added. Table 1 shows the percentages by weight of the components of this blended composition.

The maximum speed of the drawing roller was 1800 m/min, the maximum draw ratio was 4.5, the tenacity of the fiber thus obtained was 50 cN/tex.

TABLE 1

| Examples and comparative examples | 1 | 1c | 2 | 2c |
|---|---|---|---|---|
| Component I: | | | | |
| Polypropylene (MFR 12 dg/min) % | 99.10 | 99.50 | — | — |
| Polypropylene (MFR 25 dg/min) % | — | — | 99.40 | 99.80 |
| Component II % | 0.40 | — | 0.40 | — |
| Irganox 1076 % | 0.01 | 0.01 | 0.01 | 0.01 |
| Irganox 3114 % | — | — | 0.05 | 0.05 |
| Sandostab P-EPQ % | 0.09 | 0.09 | — | — |
| Irganox 168 % | — | — | 0.10 | 0.10 |
| Chimassorb 944 % | 0.17 | 0.17 | — | — |
| Calcium stearate % | 0.20 | 0.20 | 0.04 | 0.04 |
| Titanium dioxide % | 0.03 | 0.03 | — | — |

Other features, advantages and embodiments of the invention disclosed herein will be readily apparent to those exercising ordinaly skill after reading the foregoing disclosures. In this regard, while specific embodiments of the invention have been described in considerable detail, variations and modifications of these embodiments can be effected without departing from the spirit and scope of the invention as described and claimed.

We claim:

1. A propylene polymer fiber having a tenacity greater than 50 cN/tex comprising a polypropylene composition consisting essentially of an olefin polymer (I) and a high molecular weight propylene polymer (II) having a weight average molecular weight of at least 50,000, a branching index less than 1 and a melt strength from 5 to 40 cN; said propylene polymer (II) being present in a concentration from 0.1% to 10% by weight with respect to the total weight of the composition.

2. The fiber of claim 1, where the olefin polymer (I) is selected from:

1) isotactic propylene homopolymers having an isotactic index greater than 90;

2) random copolymers of propylene with ethylene and/or a $C_4$–$C_8$ α-olefin; and 3) heterophasic polymers comprising (by weight):

A) from 10 to 99.5 parts of a propylene homopolymer or a copolymer of propylene with ethylene and/or a $C_4$–$C_8$ α-olefin, containing over 80% of propylene and having an isotactic index greater than 80, or mixtures thereof;

B) from 0 to 25 parts of an essentially linear semicrystalline ethylene copolymer, insoluble in xylene at ambient temperature; and C) from 0.5 to 87 parts of a copolymer fraction of ethylene with propylene and/or a $C_4$–$C_8$ α-olefin, and optionally minor quantities of diene, said copolymer fraction containing from 10 to 80% of ethylene, and being soluble in xylene at ambient temperature;

4) mixtures of homopolymers (1) with copolymers (2).

3. A nonwoven fabric comprising the fibers of claim 1.

4. A product comprising the fibers of claim 1.

* * * * *